(12) United States Patent
Salafia et al.

(10) Patent No.: US 7,515,693 B2
(45) Date of Patent: Apr. 7, 2009

(54) CALL HANDLER SYSTEMS AND METHODS

(75) Inventors: Christopher Michael Salafia, Killingworth, CT (US); Jeremy Edward Turk, Killingworth, CT (US)

(73) Assignee: PowerPhone, Inc., Madison, CT (US)

( * ) Notice: Subject to any disclaimer, the term of this patent is extended or adjusted under 35 U.S.C. 154(b) by 971 days.

(21) Appl. No.: 10/913,880

(22) Filed: Aug. 6, 2004

(65) Prior Publication Data
US 2006/0029188 A1 Feb. 9, 2006

(51) Int. Cl.
*H04M 11/04* (2006.01)
(52) U.S. Cl. .............................. 379/45; 379/37; 379/42
(58) Field of Classification Search ............. 379/37–49; 340/505, 539.1, 539.13, 540, 5.61, 825.09, 340/573.1; 707/10; 600/300, 301, 486, 529
See application file for complete search history.

(56) References Cited

U.S. PATENT DOCUMENTS

| | | | |
|---|---|---|---|
| 5,822,544 A * | 10/1998 | Chaco et al. ................... 705/2 |
| 5,857,966 A | 1/1999 | Clawson |
| 5,989,187 A | 11/1999 | Clawson |
| 6,004,266 A | 12/1999 | Clawson |
| 6,010,451 A | 1/2000 | Clawson |
| 6,053,864 A | 4/2000 | Clawson |
| 6,076,065 A | 6/2000 | Clawson |
| 6,078,894 A | 6/2000 | Clawson et al. |
| 6,106,459 A | 8/2000 | Clawson |
| 6,570,967 B2 | 5/2003 | Katz |
| 6,587,545 B1 | 7/2003 | Antonucci et al. |
| 6,594,634 B1 | 7/2003 | Hampton et al. |
| 6,607,481 B1 | 8/2003 | Clawson |
| 6,716,041 B2 | 4/2004 | Ferderer et al. ................ 439/95 |
| 7,106,835 B2 * | 9/2006 | Saalsaa ........................ 379/45 |
| 2003/0028536 A1 * | 2/2003 | Singh et al. ................... 707/10 |
| 2005/0190892 A1 * | 9/2005 | Dawson et al. ................ 379/37 |

FOREIGN PATENT DOCUMENTS

| | | |
|---|---|---|
| DE | 1 813 165 | 6/1960 |
| DE | 32 01 142 | 1/1982 |
| DE | 102 16 483 | 4/2002 |

* cited by examiner

*Primary Examiner*—Melur Ramakrishnaiah
(74) *Attorney, Agent, or Firm*—Maier & Maier, PLLC

(57) ABSTRACT

Systems and methods are presented for handling calls. In one embodiment of the invention, a call handling system is configured for handling a variety of emergency and/or non emergency related calls. For example, the call handling system may allow a call handler to recognize and respond to certain received call information, such as that information relating to fire, police, emergency medical and/or homeland security. The call handling system comprises a call interface configured for receiving the call information. A processor is communicatively coupled to the call interface and configured for processing the call information to initiate a protocol. This protocol may, as it progresses, be used to generate data for use in a CAD system. The CAD system may subsequently dispatch responders based on the generated data.

21 Claims, 7 Drawing Sheets

CALL HANDLER SYSTEMS AND METHODS

BACKGROUND OF THE INVENTION

1. Field of the Invention

This invention generally relates to call handling. More specifically, this invention relates to receiving emergency related and/or non emergency related calls and to providing a protocol that generates appropriate responses to a received call or calls.

2. Discussion of the Related Art

Call handling of either emergency or non emergency related situations is a process of responding to a caller with information that is relevant to the presented situation. Call handling is often employed with Computer Aided Dispatch ("CAD") systems that dispatch response units, such as police, fire and/or medical units, based on received information. For example, call handling of the prior art CAD systems typically involved a CAD operator who received a call describing a certain event. The CAD operator subsequently conveyed this information to a dispatch unit by manually inputting information into the CAD system. The CAD system would then recommend the appropriate dispatch unit(s) for response to the event.

To identify the appropriate type of dispatch, the CAD operator typically read from a set of cue cards to elicit information from the caller regarding the event. For example, if the caller were to place a 911 call to report a fire, the CAD operator, depending on the experience and expertise of the operator, may read from a set of cards for eliciting information about the fire from the caller. Such information may include, for example, the location of the fire, the number of people in need of emergency and/or medical assistance due to the fire and the caller's relationship to the emergency (e.g., is the caller a passerby reporting the situation or is the caller an active party to the situation).

The set of cards, in essence, was a protocol that allowed the CAD operator to identify the appropriate response for the event. However, cue cards were simply not dynamic enough to allow a CAD operator to pursue the most appropriate line of questioning. For example, emergency CAD operators typically handle a variety of different complaints regarding emergency related situations (e.g., situations requiring fire, police and/or medical response) or non emergency related (e.g., situations requiring no response like accidental or improper 911 calls). The cue cards typically did not contain sufficient pertinent information for the CAD operator to respond to calls which required a multi-agency response. As such, the cards were ineffective for eliciting information from a caller.

Additionally, these manual card systems were cumbersome which often lead to a lack of consistency in questioning and usage. Moreover, because these prior systems were not able to dynamically respond to a call, the CAD operators were forced to classify and prioritize calls until a proper response could be provided. Further, because the card systems were static in nature and not able to capture information elicited from the caller(s), reporting, statistical analysis and quality assurance methods were virtually non-existent.

SUMMARY OF THE INVENTION

Systems and methods are presented for handling calls. In one embodiment of the invention, a call handling system is configured for handling a variety of emergency and/or non emergency related calls. For example, the call handling system may allow a call handler to more correctly recognize and respond to certain types of call information, such as call information related to fire, police, emergency medical, and/or homeland security incidents.

The call handling system comprises a call interface configured for receiving call information. Such call information may be in the form of a "chief complaint." A chief complaint as used herein is the information conveyed from the caller describing a particular situation or need. For example, a caller may convey a chief complaint regarding a certain situation and/or needed assistance such that a call handler system user may respond with a suggested course of action and/or the appropriate dispatched response units. From the chief complaint, the call handler system user may identify and initiate an appropriate protocol for the chief complaint. A processor, communicatively coupled to the call interface, is configured for processing the chief complaint (i.e., the call information) to initiate the protocol. This protocol, as it progresses, may be used to generate data in the form of a data structure to recommend the dispatch of an appropriate response. In a preferred embodiment of the invention, the call handler is capable of transferring information to a plurality of CAD systems to alert a plurality of unique response units. For example, a highway collision between automobiles may require the assistance of police, fire and medical response units. The data structure, therefore, may be transferred to one or more CAD systems to subsequently dispatch the appropriate response units (e.g., fire, police and/or emergency medical units) based on the data within the data structure.

In one embodiment of the invention, a call handling system comprises: a call interface configured for receiving call information, wherein the call information conveys substantially any of an emergency related matter or a non emergency related matter; and a processor communicatively coupled to the call interface and configured for processing the call information to initiate a protocol.

In another embodiment of the invention, the call handling system further comprises a computer aided dispatch interface configured for transferring data to one or more computer aided dispatch units.

In another embodiment of the invention, the call handling system further comprises an application program interface configured for transferring Automatic Number Identification/Automatic Location Identification ("ANI/ALI") data from a telephony system.

In another embodiment of the invention, the call handling system is configurable with one or more computer aided dispatch units and wherein the computer aided dispatch units are configured for dispatching responders based on one or more decisions of the protocol.

In another embodiment of the invention, the call handling system further comprises a display unit configured for displaying keys, wherein selected said keys change a course of the protocol.

In another embodiment of the invention, the processor is further configurable for processing data associated with the selected said keys to change the course of the protocol.

In another embodiment of the invention, the call handling system further comprises a storage unit configured for storing a database of protocol terms, wherein the protocol terms are used to initiate the protocol.

In another embodiment of the invention, the storage unit is further configured for storing a data structure and wherein the processor is further configured for transferring data to the data structure based on a course of the protocol.

In another embodiment of the invention, the data structure is transferable to a computer aided dispatch for informing a dispatched responder.

In one embodiment of the invention, a call handling network, comprises: a call interface configured for receiving call information, wherein the call information conveys substantially any of an emergency related matter or a non emergency related matter; and two or more call handling systems, wherein each call handling system is communicatively coupled to the call interface and comprises a processor configured for processing the call information to initiate a protocol, and wherein a first one of the two or more call handling systems is communicatively coupled to a second one of the two or more call handling systems for transferring the call information to the second one of the two or more call handling systems.

In another embodiment of the invention, the call interface is a call handler server.

In another embodiment of the invention, the call handling network, further comprises a computer aided dispatch interface configured for transferring data from at least one of the two or more call handling systems to a computer aided dispatch unit, wherein the computer aided dispatch unit is configured for dispatching responders based on one or more decisions of the protocol.

In another embodiment of the invention, each call handling system comprises a display unit configured for displaying keys, wherein selected said keys change a course of the protocol.

In another embodiment of the invention, each processor is further configurable for processing data associated with the selected said keys to change the course of the protocol.

In one embodiment of the invention, a call handling network comprises: a call router; and a plurality of call handling subnetworks, wherein each call handling subnetwork is communicatively coupled to the call router and configured for receiving call information from the call router, wherein each subnetwork comprises a call interface configured for receiving the call information, wherein the call information conveys substantially any of an emergency related matter or a non emergency related matter; and at least one call handling system communicatively coupled to the call interface and comprising a processor configured for processing the call information to initiate a protocol.

In one embodiment of the invention, a call handling system comprises: a call interface configured for receiving call information; a storage unit configured for storing protocol terms; and a processor communicatively coupled between the call interface and the storage unit and configured for processing the call information, for populating a database with one or more cross-referenced said protocol terms based on processed said call information and for initiating a protocol based on a selection of the one or more cross-referenced said protocol terms.

In another embodiment of the invention, the call handling system is configurable with a computer aided dispatch unit and wherein the computer aided dispatch unit is configured for dispatching responders based on one or more decisions of the protocol.

In another embodiment of the invention, the call handling system further comprises a display unit configured for displaying keys, wherein selected said keys change a course of the protocol.

In one embodiment of the invention, a method comprises: receiving call information conveying substantially any of an emergency related matter or a non emergency related matter; and processing the call information to initiate a protocol in response to receiving the call information; and transferring data to a data structure based on one or more decisions of the protocol.

In another embodiment of the invention, the method further comprises transferring at least a portion of the data structure to one or more computer aided dispatch units.

In another embodiment of the invention, transferring said at least a portion of the data structure comprises informing a dispatched responder about the call information.

In another embodiment of the invention, the method further updating one or more CAD systems via the data structure for dispatching responders based on the one or more decisions of the protocol.

In another embodiment of the invention, the method further comprises displaying keys, wherein selected said keys change a course of the protocol.

In another embodiment of the invention, the method further comprises processing data associated with the selected said keys to change the course of the protocol.

In another embodiment of the invention, processing comprises processing selected protocol terms to initiate the protocol.

DETAILED DESCRIPTION OF THE DRAWINGS

Figure 1:
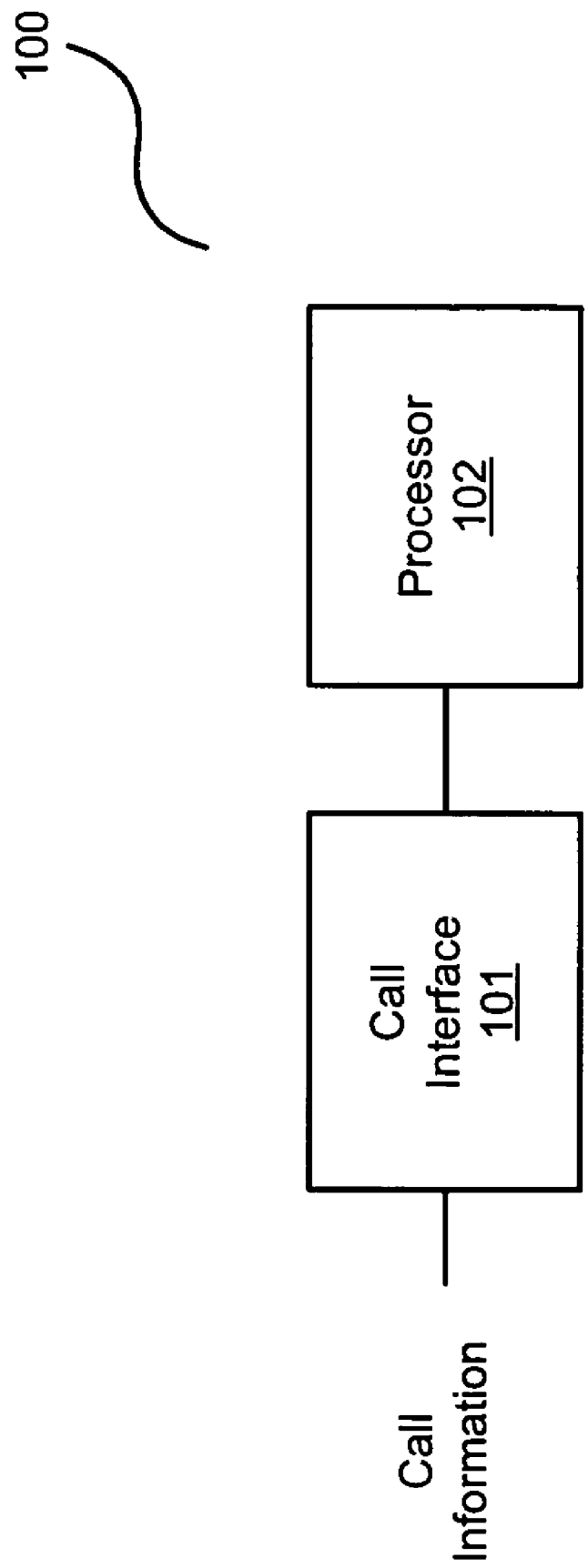
FIG. 1 is a block diagram of a call handling system in one exemplary embodiment of the invention.

While the invention is susceptible to various modifications and alternative forms, a specific embodiment thereof has been shown by way of example in the drawings and will herein be described in detail. Those skilled in the art will appreciate that the features described below can be combined in various ways to form multiple variations of the invention. Accordingly, the invention is not limited to the specific examples described below, but only by the claims and their equivalents.

With reference now to FIG. 1, FIG. 1 is a block diagram of call handling system 100 in one exemplary embodiment of the invention. In this embodiment, call handling system 100 comprises call interface 101 and processor 102 and is configured for handling call information. For example, call handling system 100 may be configured for interfacing with a telephony system to receive call information and respond to the received information with relevant response information and/or appropriate dispatching information. The call information may regard substantially any of an emergency or a non emergency related situation, such as that received by a 911 call system identifying a certain emergency situation requiring police, fire, medical assistance and/or homeland security. Each call is uniquely handled and subsequently creates a unique record of the events transpiring during the call.

While each call may be unique, call handling system 100 provides call handling consistency by adapting to dynamic situations. For example, call handling system 100 may allow the system user to dynamically respond to the call information received through a single protocol having a series of communicatively linked scripts. The protocol allows the user to respond with situationally relevant information to the caller, to dispatched response units, and/or to other relevant parties based on the received call information. Since this call information can change, the protocol can generate and relay this relevant information by linking to scripts that are relevant to the call information as it changes. As such, call handling system 100 may assist a user of the call handling system in recognizing certain situations and in providing appropriate information and/or responses. For example, call handling system 100 may provide the information necessary for a caller to react to a particular situation. The call handling system 100 may also provide information to a response unit (e.g., fire response, police response, et cetera) such that the response unit may properly handle the situation.

Processor 102 is communicatively coupled to call interface 101, and is configured for processing the call information and for initiating a protocol based on the call information. For example, once certain call information reporting a specific situation (i.e., a chief complaint), is received, processor 102 processes the information and initiates a protocol that runs a script suited for the specific situation. Scripts as used herein are sets of preformatted processes implemented by the protocol and configured for guiding a user in responding to call information.

An illustrative example of the operative characteristics of the call handling system 100 is now provided. In this example, a caller may use call handling system 100 to report an emergency situation, such as a fire, a situation requiring police action and/or a situation requiring emergency medical assistance. Information regarding this call may be automatically transferred to the call interface 101 using standard 911 telephony. The data structure passed from the telephony system of one embodiment is also known as ANI/ALI. The ANI/ALI is transferred to processor 102 in a revised structure to enable cross reference with existing call records in database 202. Those skilled in the art should readily recognize that the data structure ANI/ALI may be transferred from a telephony system provider. For example, a 911 call generally transfers information about the caller such as the caller's phone number, identification and, in some instances, location. In this embodiment, the information initializes a search through existing call records and if necessary alerts call handling system 100 of previous incidents from the same telephone number or location prior to the launch of the call handling system's protocol.

A user operating call handling system 100 to elicit information from the call in the form of an initial survey question which may already contain ANI/ALI data. Such a question may include a description of the situation for which assistance is sought. Based on the caller's response, the call handler user inputs the information into call handling system 100. Processor 102 processes the input information and initiates a protocol. The initiated protocol, based in part on the call information, identifies and runs an appropriate script.

Once the protocol is initiated, call handling system 100 prompts the system user to elicit additional information from the caller. For example, call handling system 100 may prompt the user to ask additional questions of the caller that are specifically relevant to the situation for which the caller seeks assistance. Responses to these questions may dynamically alter the course of the protocol to more appropriately respond to the caller with assistance (e.g., advice and/or dispatched response units).

As the protocol progresses, processor 102 may further generate data regarding additional detail of the situation. For example, processor 102 may process the call information and make recommendations based on received call information. These protocol decisions may generate data which processor 102 may store in a data structure. The data structure may be subsequently transferred to dispatch systems, such as a CAD, to a caller and/or to other relevant parties. A transferred data structure comprising additional information of the situation for which a caller seeks assistance may be used by a particular party to appropriately respond to the situation. For example, the data structure may be transferred to a dispatch system to alert and/or dispatch an appropriate response unit, such as fire, police and/or emergency medical.

In one preferred embodiment of the invention call handler system 100 is configured to operate within a general-purpose computer workstation. Accordingly, call handler system 100 may be a software system operable with a computer to perform according to the principles described herein. However, those skilled in the art should readily recognize that other embodiments may fall within the scope and spirit of the invention. For example, call handler system 100 may be implemented as a mobile computing device, such as a Palm Pilot. Moreover, those skilled in the art should readily recognize that the preferred embodiment shown and described herein may be configured in hardware, software, firmware and/or various combinations thereof. Those skilled in the art are familiar with hardware, software, firmware and their various combinations.

Figure 2:
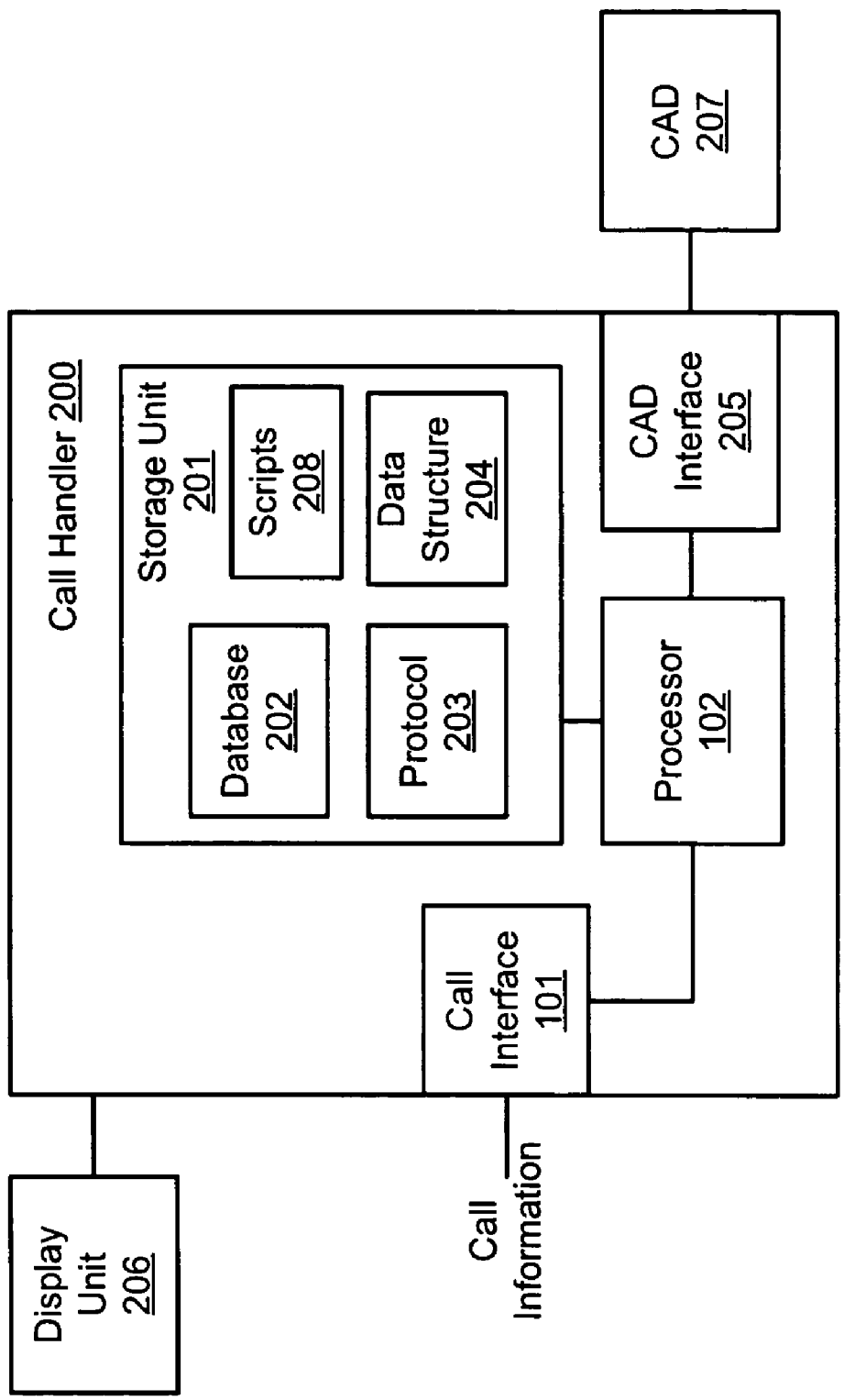
FIG. 2 is a block diagram of a call handler configured with a CAD system in one exemplary embodiment of the invention.

FIG. 2 is a block diagram of call handler 200 configured with CAD system 207 in one exemplary embodiment of the invention. Call handler 200 is configured to operate in accordance with the principles described herein above and comprises call interface 101 and processor 102, shown and described in FIG. 1.

In this embodiment, call handler 200 further comprises a storage unit 201 configured for storing data structure 204, database 202 of protocol terms and protocols 203. Database 202 may include a list of words or well known terms used to cross-reference, or rapidly identify, a particular situation based on received call information. For example, as a caller conveys information to a user of call handler 200, the user may input the information in the form of a keyword into call handler 200. Call handler 200 may then populate database 202 and display a list of cross-referenced protocol terms via display unit 206. This displayed information provides a "short list" of scripts 208 which are most relevant to the situation presented.

The user of call handler 200 may select one of the displayed terms which most appropriately identifies the caller's situation. Once a script is chosen, the protocol conforms to the information provided in the script and the user of call handler 200 is prompted to perform certain actions. For example, a selected script may initiate a protocol 203 and then prompt the user to elicit more information from the caller, alert appropriate response units, convey information to the caller, et cetera.

The protocol 203 and the associated scripts 208 may be used for emergency related situations, non emergency situations and/or training. For example, certain scripts 208 may be used to initiate a protocol 203 for responding to an emergency situation such as a fire, a situation requiring police, a medical emergency situation and/or a situation impacting homeland security. Additionally, some scripts 208 may be configured for initiating protocol 203 to respond to a caller when no emergency exists, such as situations when a caller accidentally calls or when a caller is simply requesting information.

Moreover, some scripts 208 may be configured for initiating a protocol 203 to train a call handler 200 user in the aspects of call handling.

Once protocol 203 is initiated and the protocol advances, data structure 204 is filled with data regarding the course of the protocol. For example, a user by selecting indicators from and/or inputting certain information to call handler 200 may build data structure 204. A constructed data structure 204 may therefore include information pertinent to the call and/or a dispatch unit. This data structure can then be stored in a database and/or transferred to CAD 207 via CAD interface 205.

In another embodiment of the invention, display unit 206 is also configured for displaying user selectable hot keys. For example, the user of call handler 200 may select one of the hot keys in order to advise the caller on a course of action in response to circumstances at the scene. The hot keys, in essence, provide "short cuts" to procedures that a system user may access without being directed to do so by an initiated call handling protocol.

In a preferred embodiment, the presented hot keys are continually available to the call handler user. The call handler user may therefore select a hot key to learn more about handling a particular situation as it is presented. For example, a cardiopulmonary resuscitation ("CPR") for adults hot key may be continuously presented to the call handler user such that the user may obtain more information relevant to CPR should the situation require such assistance. In one embodiment, the hot keys are customizable based on the needs of the call center. Such hot keys may therefore be used to obtain information that is more relevant to a particular call center.

To illustrate one exemplary scenario, a caller may convey information relating to an emergency medical situation, such as that of an adult suffering a heart attack. The user may input terms conveyed by the caller into call handler 200, which in turn populates database 202 with protocol terms that processor 102 identifies as symptomatic of heart related conditions. Display unit 206 may then be directed by processor 102 to present certain hot keys that are relevant to a heart related, emergency medical situation.

During the exemplary scenario, the caller may convey information that the situation has dramatically changed. For example, the caller may inform the call handler 200 user that the adult has stopped breathing. The system user may, therefore, select a hot key, such as CPR for adults, in response to the changed call information. Processor 102 may process information from the selected hot key to automatically transfer information to CAD 207 for dispatching a response unit(s) and/or have the user assist the caller. In the CPR example, the selected CPR hot key may alert an emergency medical response unit and/or provide CPR instructions to assist the caller in performing CPR on the adult.

Hot keys are essentially shortcuts enabling quick access to procedures that may otherwise not have been recommended during execution of the script. Procedures not quickly accessible via hotkeys can be selected from a procedure search window within a Graphical User Interface ("GUI"; e.g., GUI 300 of FIG. 3 below herein). The selection of additional procedures is not exclusively limited to the use of hot keys or procedure searches; triggers within each script may result in the display of procedures in direct response to data entered by the user. In one exemplary scenario, a caller may respond to a question regarding a victim's breathing status. A response that indicates that the victim is not breathing results in a negative reply keyed into the GUI. This triggers a launch of the procedure for CPR to appear within the existing script display.

In another embodiment of the invention, the call handler 200, in response to information from the caller, may trigger a bridge to another protocol 203. Additionally, the call handler 200 may be initiated in response to call information and/or when a particular script 208 does not provide the appropriate response information for a call. For example, when call information changes in such a way that the present script is no longer relevant to a presented situation, a selection of a situationally relevant trigger will bridge the protocol to a new script to enable the user to respond more appropriately.

A bridge as described herein is information inputted into call handler 200 that results in the entrance into another script. For example, information from a caller indicating stomach pain of a victim may result in a script for abdominal pain being automatically loaded into the user interface. Subsequent questions for determining the victim's age and gender may result in a response that may contraindicate a heart attack and automatically recommend a bridge to a Chest Pain script.

While one exemplary preferred embodiment of call handler 200 has been shown and described herein, those skilled in the art should readily recognize that the invention is not intended to be limited to the preferred embodiment. Other embodiments may fall within the scope and spirit of the invention. For example, although illustrated as being communicatively coupled to one CAD system 207, call handler 200 may be communicatively coupled to a plurality of CAD systems. Because unique response units are occasionally dispatched from different CAD systems often from different geographical locations, a call handler embodiment with multiple CAD system connections may advantageously parse and transfer information relevant to each dispatched response unit. For at least these reasons, the invention should not be limited to the preferred embodiment; rather, the invention should only be limited by the language recited in the claims and their equivalents.

Figure 3:
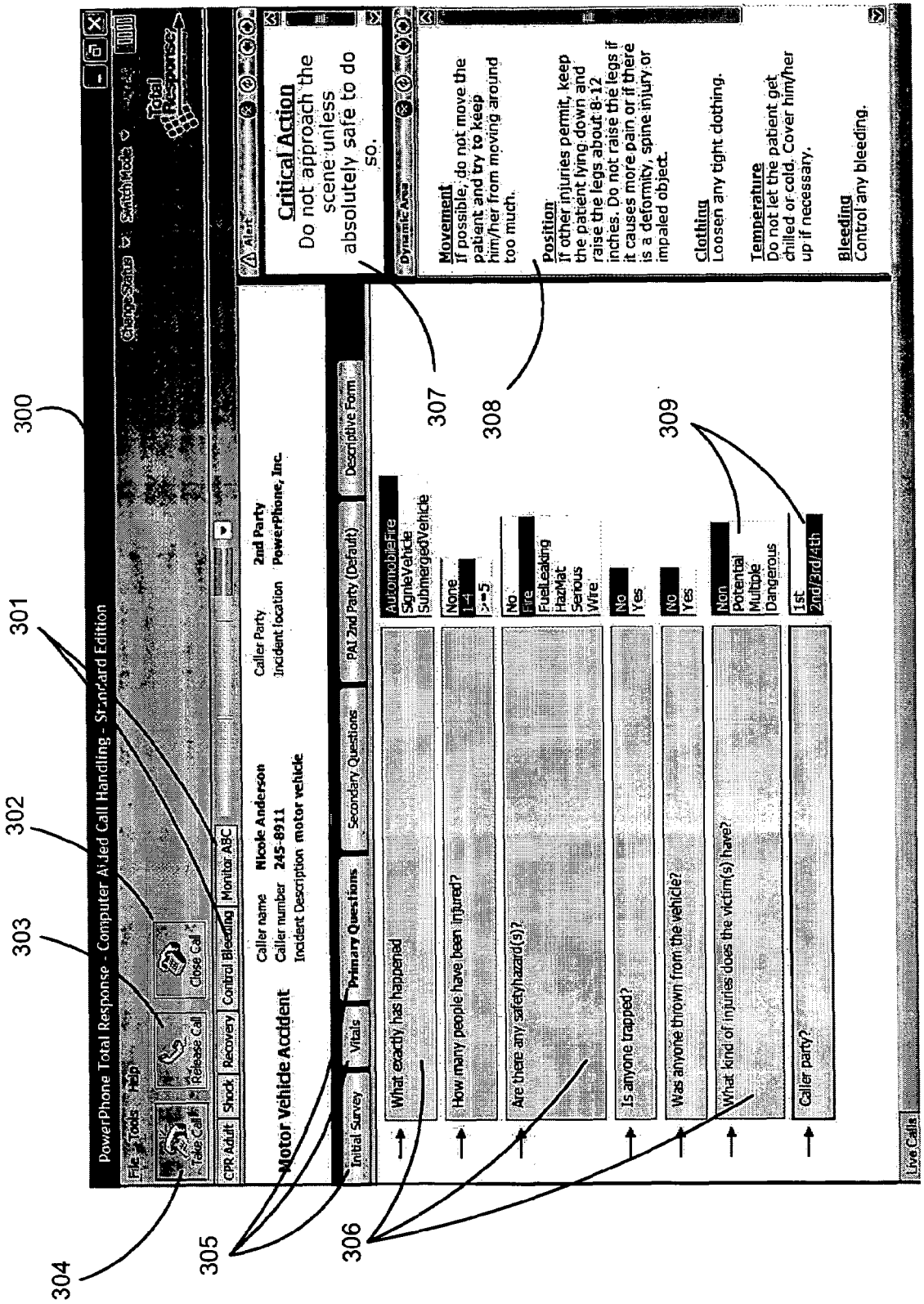
FIG. 3 is a graphical user interface of a call handler in one exemplary embodiment of the invention.

FIG. 3 is a GUI 300 of a call handler in one exemplary embodiment of the invention. Similar to other GUIs and application program interfaces ("API"), GUI 300 may be displayed using a general-purpose computer monitor through the processing of software instructions. Accordingly, in this embodiment, GUI 300 represents a software implementation of a call handler system, such as call handler 200 of FIG. 2.

A general-purpose computer system may controllably operate GUI 300 as part of a call handler application operable within a computer operating system, such as Windows, Solaris, UNIX, Linux and/or other computer operating systems. Those skilled in the art are familiar with operating systems.

In this embodiment, as a caller conveys call information regarding a situation, a call interface transfers the conveyed call information to a general-purpose computer system. The computer interface may place the call in a pending status until a call handler becomes available. A user of the call handler system may take the call by selecting the "Take Call" button 304 or collect a new call from the 'Live Call List" which contains reference to new calls passed directly into the call handler system from a telephony system. A caller may also release a call by selecting the "release call" button 303 to transfer the received call information to another call handler user who may be more qualified, for example, to handle the call information. In one embodiment, the release call button 303 may also transfer the call itself to another call handler user. Additionally a "close call" button 302 is configured for initiating a script from which a call record may be closed.

Hot keys as described in FIG. 2 are displayed as buttons 301 within GUI 300 of the call handler system. The hot key buttons 301 illustrated in this exemplary embodiment include CPR for an adult, shock, recovery, control bleeding and monitor Airway, Breathing and Circulation ("ABC"). When one of these hot key buttons 301 is selected, the protocol being processed may alter course to direct the call handler user to request information specifically relevant to the selected hot key 301. For example, when a user selects hot key 301 for adult CPR in response to received call information, the protocol may dynamically respond to the selected hot key and display information that is relevant to adult CPR via GUI 300. The protocol may further dynamically respond to the selected hot key by changing the format of GUI 300 altogether such that GUI 300 displays CPR related instructions, CPR related protocol tab(s) 305, CPR related alerts window 307 and/or CPR related dynamic area window 308.

Protocol tabs 305, in this embodiment, are configured for building (e.g., inputting information to) a data structure, such as data structure 204 of FIG. 2. Selected protocol tabs 305 may also progress an initiated protocol. For example, once the caller conveys information to the call handler user, the call handler user may input that information into the call handler system. The call handler system processes the information to select an appropriate protocol (i.e., a protocol script). Once the protocol is initiated, the call handler system may display protocol tabs 305 to advance the protocol and/or configure the data structure. Examples of such protocol tabs 305 include an "Initial Survey" tab, a "Vitals" tab, a "Primary Questions" tab and a "Secondary Questions" tab.

Each tab 305 may prompt the call handler user to elicit more information from a caller. For example, a selected Primary Questions tab may present the call handler user with a series of question fields 306 to extract more information regarding the situation from the caller. As exemplarily illustrated, the primary questions tab 305 displays question fields 306 for determining the following: "What exactly has happened?"; "How many people have been injured?"; "Is anyone trapped?"; "Are there any safety hazards?"; "Anyone thrown from the vehicle?"; and "What kind of injuries does the victim(s) have?"

Relevant to questions fields 306 are the user selectable responses 309. These responses 309 may allow the call handler user to rapidly configure the data structure based on a caller response. For example, when the call handler user asks the question "are there any safety hazards," the call handler user may quickly select any combination of the preconfigured responses typically conveyed by a caller. In the safety hazards example, the call handler user may select any combination of the responses of fire, fuel leaking, hazardous materials ("HazMat"), et cetera. Those skilled in the art, however, should readily recognize that responses 309 described and shown herein are only exemplary of the responses which may be used in GUI 300.

Other features exemplified in GUI 300 include alerts window 307 which almost immediately notifies the call handler user of situations requiring urgent action. For example, as the protocol progresses, information immediately relevant to the progress of the protocol may be displayed in alerts window 307. As exemplarily illustrated herein, alerts window 307 displays a critical action to "not approach the scene unless absolutely safe to do so." The call handler user may convey this information directly to a caller and indirectly to a response unit through the configuration and transfer of the data structure. Again, those skilled in the art should readily recognize that alerts window 307 may be configured to display other emergency and/or non emergency event related information.

Still other features include a dynamic area window 308 which may display information, instructions and/or other data relevant to the protocol progress. For example, if the protocol involves an emergency medical response, a dynamic area window 308 may display instructions relevant to that emergency medical protocol. As illustrated herein, the instructions include information for the call handler and/or the caller regarding the movement, position, clothing, temperature and/or bleeding of a person in this particular emergency medical situation. The dynamic area window 308, in essence, performs a function of a "For Your Information" ("FYI") window. Although discussed with respect to emergency medical situations, dynamic area window 308 may display information instructions and/or other data relevant to the situation presented, such as a situation pertaining to fire, police and/or homeland security.

While one embodiment has been shown and described in detail, those skilled in the art should readily recognize that GUI 300 may be configured in a variety of manners to operate in accordance with the principles of the invention described and illustrated herein. Accordingly, the invention is not intended to be limited to the illustrated user interface of GUI 300. Further, the invention is not intended to be limited to any particular protocol described within GUI 300. Other protocols such as those relating to non emergencies and/or other emergencies may also fall within the scope and spirit of the invention. As such, the invention is only intended to be limited by the language recited in the claims and their equivalents.

Figure 4:
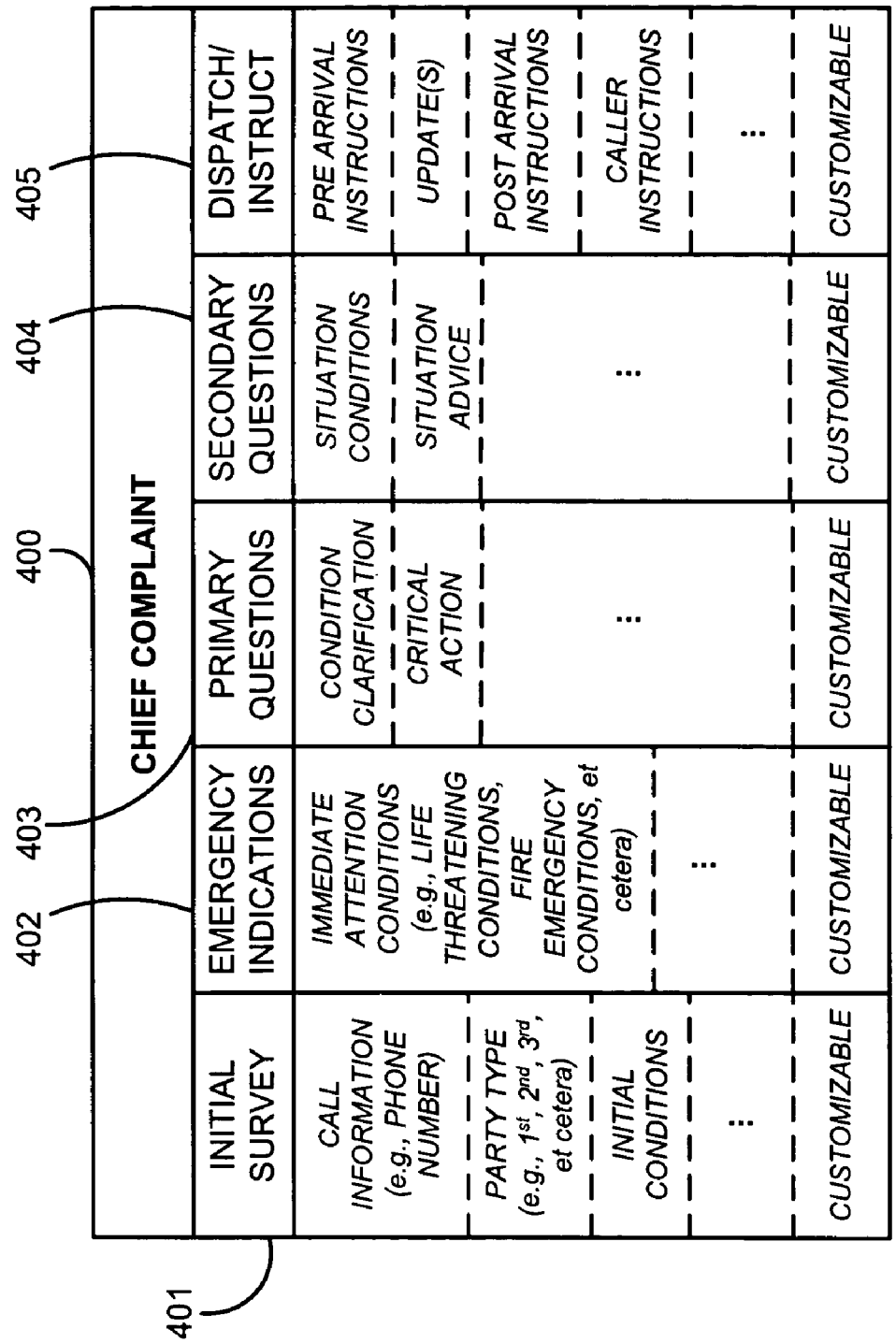
FIG. 4 is a data structure in one exemplary embodiment of the invention.

FIG. 4 is data structure 400 in one exemplary embodiment of the invention. In this embodiment, data structure 400 is representative of a chief complaint from a caller. Data structure 400 comprises one or more data sections such as an initial survey section 401, emergency indications section 402, primary questions section 403, secondary questions section 404 and dispatch instructions section 405. As a protocol advances, data structure 400 is configured with data within the one or more data sections. This data may be advantageously used by a CAD system to alert and/or dispatch a response unit(s). However, those skilled in the art should readily recognize that the data of data structure 400 may be transferred to other devices communicatively linked thereto. For example, the data may be transferred to pagers, mobile computing devices, cellular telephones, emergency radio devices capable of receiving data, and/or network based computing systems. Additionally, this data may be configured in a variety of well-known formats, such as e-mail and text messaging, to alert various response agencies.

Examples of initial survey information may include caller information, such as a caller's phone number and the caller's party type (e.g., a first, a second, a third or a fourth party type). For example, a person calling about a situation involving that person is identified as a first party type caller. That person's phone number and party type may be input to data structure 400 is part of the initial survey 401. Examples of a second party type include a person who is simply reporting the incident and who is also in close proximity to the incident. Examples of a third party type include a person reporting an incident some distance away from the incident location. Examples of fourth party type may include agencies, such as alarm monitoring centers. Other information related to the initial survey may include initial conditions such as types of distress and/or emergency situations for the specific purpose of determining the correct call handling script to be used. For example, the initial conditions surrounding a fire may include the type of structure on fire and whether the blaze is still burning.

Emergency indications 402 may include information for situations of immediate attention. For example, a person may call a call handler system to complain of chest pains. Such a complaint may alert the call handler user to dispatch immediate medical assitance as the chest pains may be symptomatic of a heart ailment. The emergency indications 402 may also be used to provide additional detail of the location of the situation.

Primary questions 403 may include clarifying information regarding the chief complaint. Information contained herein may be used to facilitate a dispatch recommendation. For example, as the protocol progresses, the call handler user may be prompted to ask additional questions regarding the caller's specific situation. The corresponding information may be used to clarify information that was previously conveyed by the caller. Additionally, the information of the primary questions may be used to raise awareness for those involved to a heightened state for the situation (e.g., situations involving police and/or fire response). For example, the primary questions may be used to determine possible risks and/or dangers at the scene for the persons at the scene as well as responders dispatched thereto.

Secondary Questions 404 may include additional information that was elicited from a caller to assist responders en route to the incident scene. Such information input to the secondary questions 404 data section may include information regarding a specific condition of the situation. For example, in a chemical fire, secondary questions 404 may contain information elicited from a caller regarding the exact type of chemical and any instructions for a responding fire unit.

Also in this embodiment of data structure 400 is section 405 for configuring data structure 400 with dispatch instructions/recommendations in terms of priority and types of responders needed at the scene. Additionally, a further section includes pre-arrival instructions. Such instructions may, for example, assist in ensuring safety of people in the vicinity or in protecting evidence. The instructions can be uniquely formatted in data section 405 in response to an initiated protocol.

An additional feature of each data section pertains to customizable fields. These fields may include information relevant to certain procedures of a particular call center. For example, one call center may have procedures that differ from those of another call center. Accordingly, the data structure may be formatted to include information that is relevant to a specific call center.

Although described in detail with respect to one exemplary preferred data structure, those skilled in the art should readily recognize that other data structures may be generated to have one or more of the data sections described and illustrated herein. Accordingly, the invention is not intended to be limited to the preferred embodiment. Rather, the invention is only intended to be limited by the claims and their equivalents.

Figure 5:
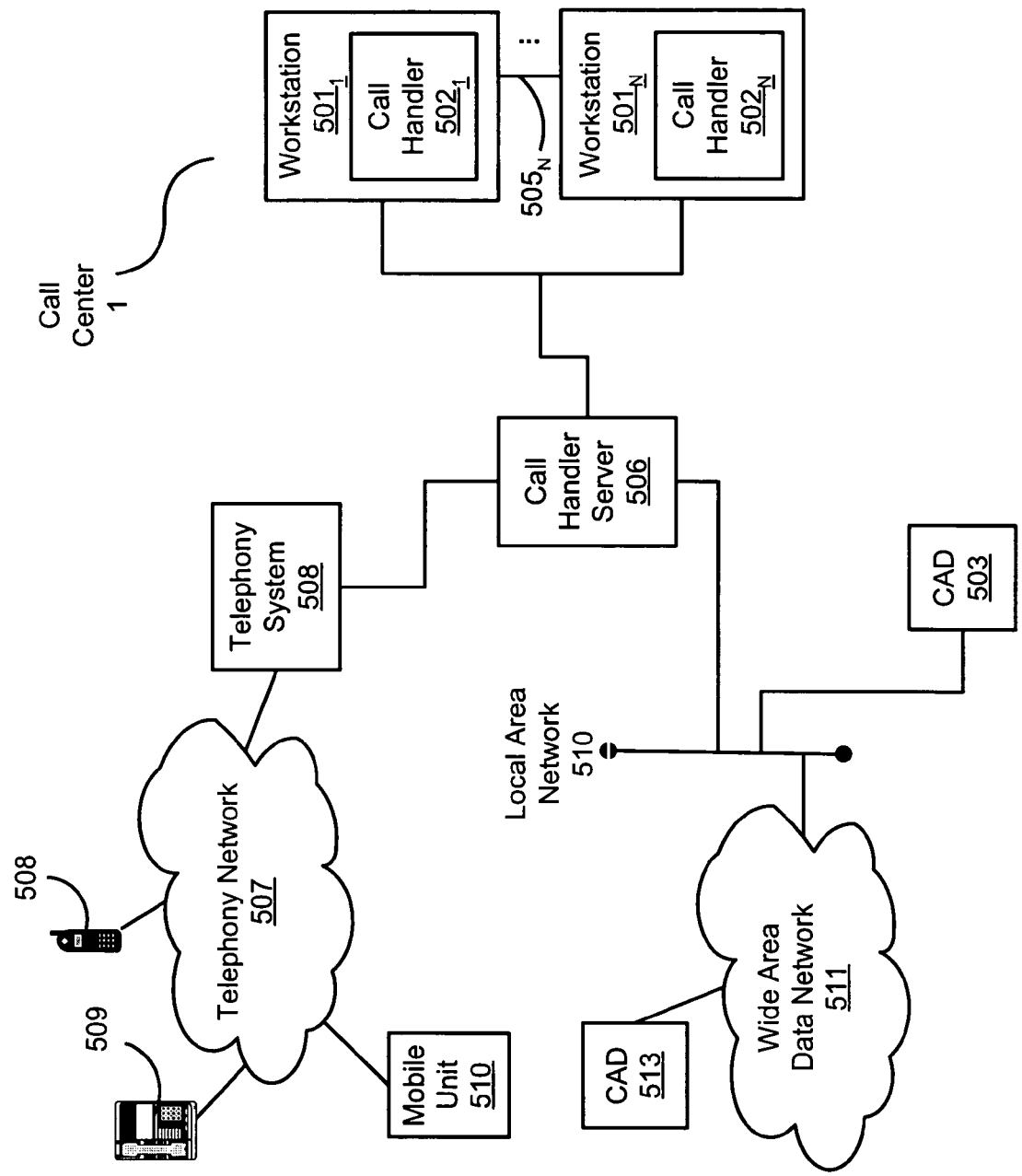
FIG. 5 is a block diagram of a call handling network in one exemplary embodiment of the invention.

FIG. 5 is a block diagram of a call handling network in one exemplary embodiment of the invention. In this embodiment, a caller may convey call information from any of a mobile type device (e.g., a cellular telephone or a mobile computing unit, such as a PalmPilot) or a "land line" based device (e.g., a typical home phone or a computer terminal). These devices (labeled 508, 509 and 510) may communicate through telephony network 507 to convey call information to the call handling network. Additionally, a telephony system 508 is communicatively connected to the telephony network 507 for receiving the call information from the caller.

In this embodiment, a call center 1 is configured with a subnetwork of call handling workstations 501. A call handler server 506 is configured for transferring the call information from telephony system 508 to a call handling workstation 501 (labeled $501_1 \ldots 501_N$) within the call center 1. For example, telephony system 508 may be a switching system or a router that receives calls from telephony network 507. The telephony system 508 may transfer a call to the call handler server 506 for subsequent processing by a call handling workstation 501.

The call handler server 506 may determine which call hander 502 is to receive the call and initiate a call handling protocol. For example, call handler server 506 may be aware of call hander 502 capabilities (e.g., user qualifications, call backlog, et cetera). Accordingly, call handler server 506 may assign a received call to one of the call handlers 502 based on the capabilities of the call hander. Once assigned, the call hander 502 runs the protocol as initiated by call handler server 506

Call handling workstations 501 are configured for operably controlling associated call handlers 502 (labeled $502_1 \ldots 502_N$). For example, a call handling workstation 501 may be configured from a general-purpose computing system, such as a personal computer ("PC"). As such, the call handling workstation 501 may include software operable to control and display call handler 502 (see e.g., GUI 300 of FIG. 3).

Call handler 502 may operate similar to the embodiments shown and described herein above. Call handler 502 may further comprise additional features which allow for the communicative coupling to other call handlers within call center 1. For example, call handler 502 may comprise network components which allow a call handler within a particular call center to transfer call information via communication link $505_N$ to another call handler within the call center (see e.g., button 303 of FIG. 3). Such a communicative coupling may be advantageous when a user of a first call handler 502 needs to transfer the call information to a user of a second call handler 502 because the user of the first call handler is either unqualified or too busy to handle the call. Network components are known to those skilled in the art and may be implemented through a combination of hardware and software components.

In this exemplary embodiment, workstations 501 have no direct communication with CAD 503. The call handler server 506 supports the logic, trigger handling and communication functions, as well as acting as a central repository of protocol scripts. For example, call handler server 506 may be configured to receive call information and initiate an appropriate protocol. Once triggered by a call, the call handler server 506 may provide protocol information to a logically selected call handler 502. Such a selection may be based on capabilities of a given call handler 502.

Each workstation 501, however, may retain an independent copy of the protocol scripts to enable continuity in the event that connection with the server is lost. In such an event, call handler 502 may continue to be used to ask appropriate questions and record any information provided by the caller. This data may then be copied to the server when the connection is restored.

A call handler 502 may transfer dispatch information to any local CAD 503 via the call handler server 506 and a communicative coupling to a Local Area Network ("LAN") 510. Alternatively, call handler 502 may transfer dispatch information to a remote CAD 513 via the call handler server 506 and a communicative coupling to Wide Area Network ("WAN") 511. LANs and WANs are known to those skilled in the art. This dispatch information may be in the form of a data structure such as that described in FIG. 4. The CADs may use the dispatch information to alert and/or dispatch an appropriate response unit. In a preferred embodiment of the invention, the call handler 502 is capable of transferring information to a plurality of CAD systems, such as CAD 503 and CAD 513, to alert a plurality of associated response units. For example, a highway collision between automobiles may require the assistance of police, fire and medical response units. Accordingly, the call handler 502 may transfer information to CAD systems associated with a plurality of unique response units that are necessary to the situation presented.

The network described and illustrated herein is only exemplary in nature. Those skilled in the art should readily recognize that the number of call centers and/or call handler workstations within a call center may be a matter of design choice. Accordingly, the invention is not intended to be limited to the illustrated embodiments. Rather, the invention is only intended to be limited by the claims and their equivalents.

Figure 6:
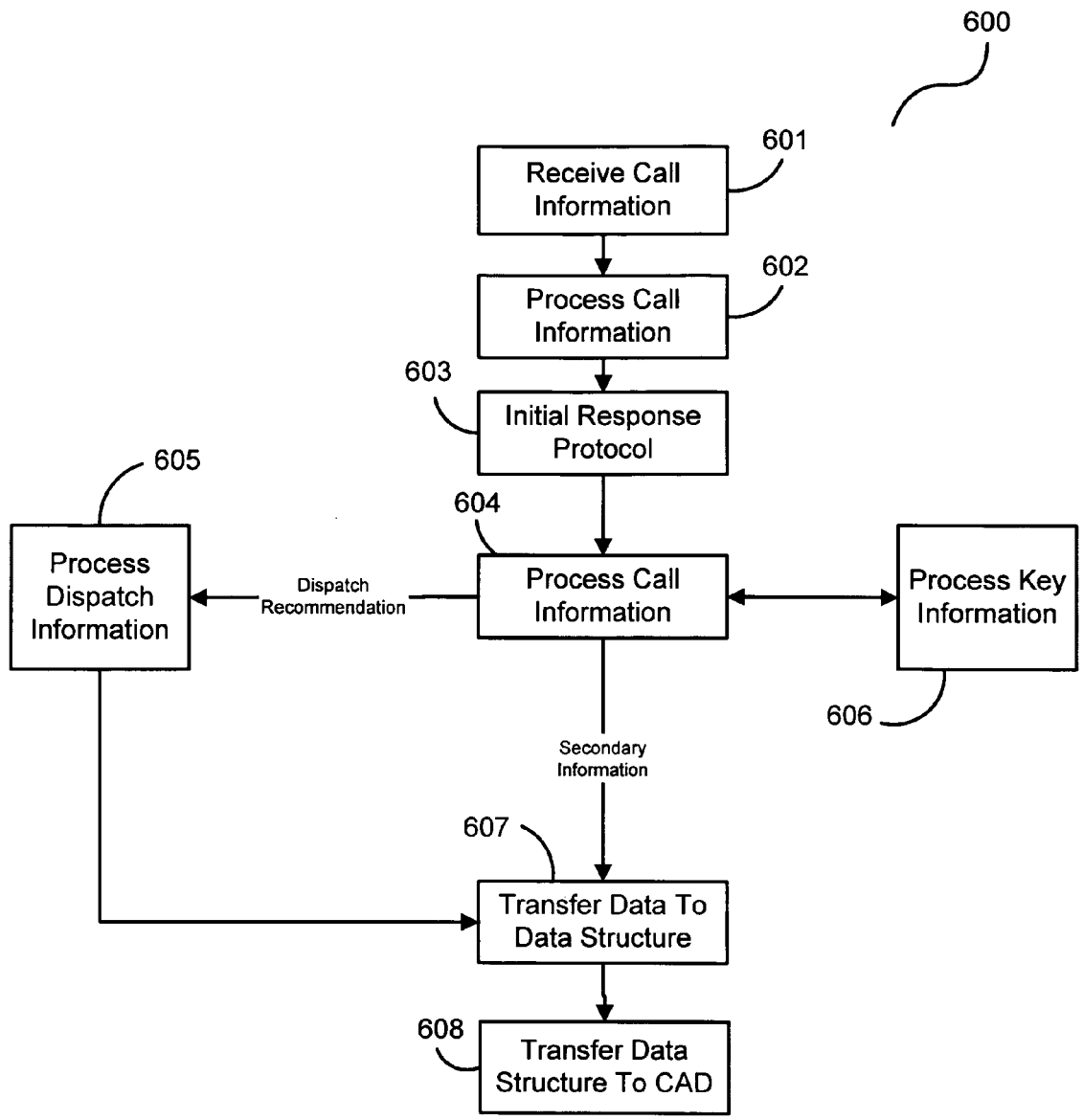
FIG. 6 is a flowchart in one exemplary methodical embodiment of the invention.

FIG. 6 is flowchart 600 in one exemplary methodical embodiment of the invention. Call information is received in element 601. For example, a caller identifying information relating to an emergency situation or a non emergency situation may convey call information to a call handler system of the preferred embodiments described herein above to report the situation. The call information is processed in element 602 to provide an initial protocol (element 603). For example, a processor, such as processor 102 of FIG. 2, may determine an appropriate protocol based on the call information and initiate the protocol therefrom.

While the protocol is in progress, a call handler system may respond to certain indications by processing call information in element 604. Processed call information may result in a dispatch recommendation presented to the call handler user. This dispatch information may be either accepted or rejected by the call handler user, in element 605. Accepted dispatch information may be transferred to data structure in element 607.

The call handler user may also be provided with certain user selectable hot keys that when selected are processed to provide information to call handler user, in element 606. For example, once a certain situation is presented to the call handler user, the user may select a continually present hot key that is relevant to that situation. Once selected, information and/or instructions may be presented to the call handler user to allow the user to appropriately respond to the situation. In one embodiment, the call handler may process information from selected hot keys and/or received call information to change a protocol to respond to other situations being presented in element 606. In this embodiment, the hot key information can be processed and call handling can be thereby redirected to another protocol script. For example, when a caller conveys information of a specific situation, a call handler user may select a pre-defined condition relevant to that situation. In the event that a hot key is selected and/or based on processed call information, the call handler system may automatically recommend another protocol that is more relevant to the situation presented to the call handler user.

During the processing of the protocol, secondary information, such as that described herein above, may be transferred to a data structure, in element 607. Because of the secondary information and the dispatch information, the resulting data structure may provide information that is relevant to an appropriate response. Once enough information has been transferred to the data structure, the data structure may be transferred to one or more CAD systems, in element 608. For example, once enough information has been received to select an appropriate dispatch response, the data structure may be transferred to the CAD system to alert and/or dispatch the appropriate response units.

Figure 7:
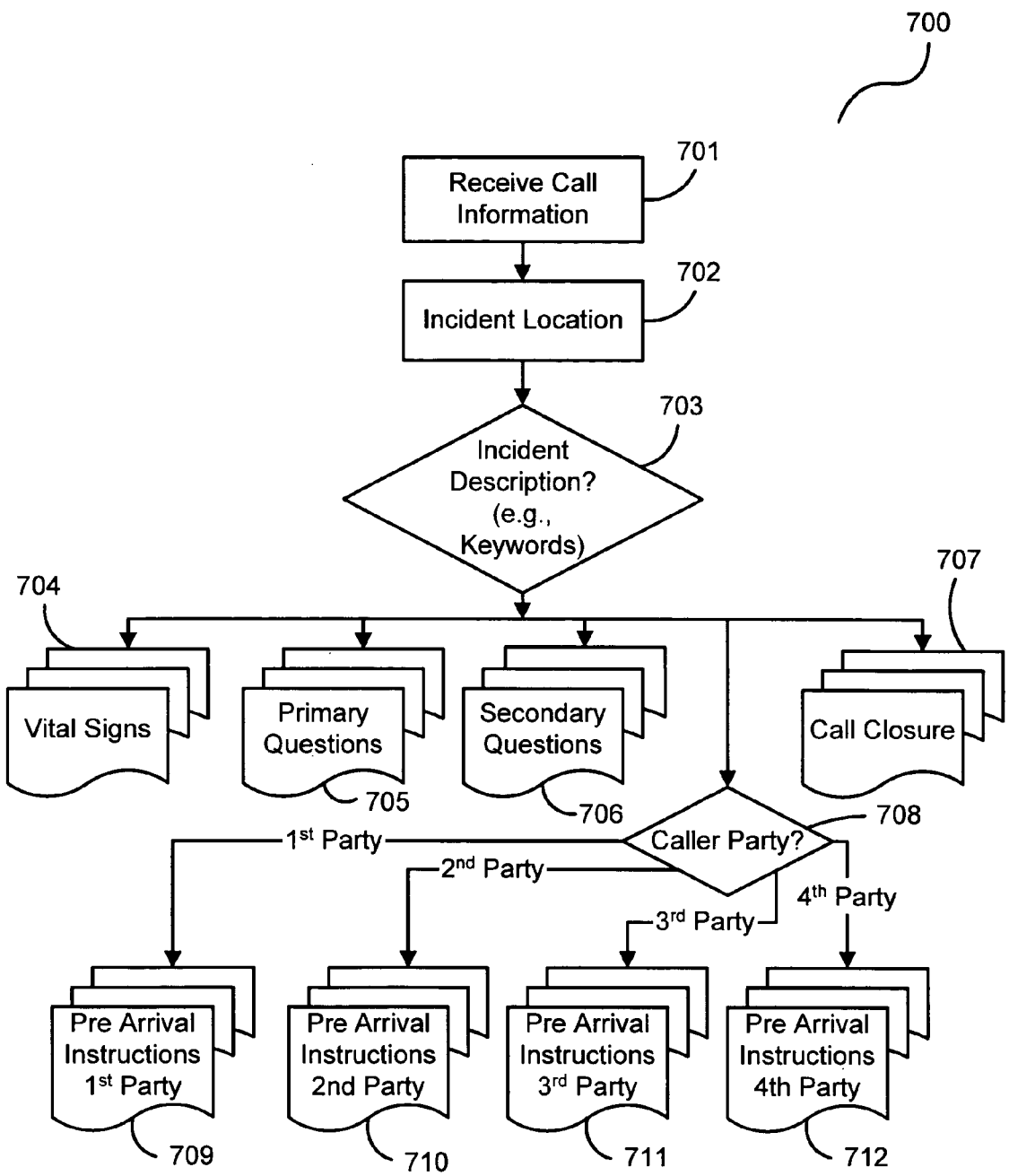
FIG. 7 is a flowchart in another exemplary methodical embodiment of the invention.

FIG. 7 is flowchart 700 in another exemplary methodical embodiment of the invention. In this embodiment, flowchart 700 represents certain processes relevant to a call handling system, such as those described and illustrated herein.

Call information is received in element 701 to initiate a protocol. With the protocol initiated, an incident location is determined, in element 702. The protocol may then prompt a call handler user to elicit more information from a caller, in element 703. For example, the call handler user may be presented with questions for the caller to determine an incident description such that the call handler user may initiate the protocol based on a selection of keywords populated from a database.

Once a keyword is selected, the call handler user may be presented with a protocol interface in the form of a GUI, such as GUI 300 described in FIG. 3. This protocol interface may include question fields and/or buttons to construct a data structure, such as data structure 400 of FIG. 4, with information relating to the situation reported by the caller. For example, the user may be presented with vital sign questions 704, primary question 705 and/or secondary questions 706 as described in GUI 300 of FIG. 3. It is not a necessary feature of the invention, however, for the user to ask these questions in any particular order.

In some embodiments, the user may ask these questions in an order that the user believes is relevant based on the user's experience. In a preferred embodiment, a call handling system may determine which questions are to be asked first based on preprogrammed decisions within the call handling system. For example, once a protocol is initiated, a certain preprogrammed script may prompt the user to ask some or all of the questions 704, 705 and/or 706 in an order that was predetermined for a particular situation.

Based on questions asked of the caller, the call handler user may have determined the type of caller party type in element 708. Once the caller party type is determined, pre arrival instructions and/or other information relevant to the caller may be formatted with the data structure, in elements 709, 710, 711 and 712 (i.e., respective of the party types 1, 2, 3 and 4). The formatted data structure may then be used to ensure appropriate instructions are available to the call handler in relation to the caller's immediate needs. For example, the first party caller may call with information pertaining to a certain emergency situation. Once information about the first party caller is ascertained, pre arrival instructions may be formatted with this information and used by the call handler user to assist the caller.

The number of the caller party types may depend on the protocol in progress. For example, a protocol may be initiated in response to call information regarding a particular caller type. Some caller party types, however, may not be relevant to the protocol in progress. Accordingly, these caller party types would not be necessary for presentation to the user of the call handling system performing the method described herein. Such an embodiment allows the protocol to operate in a manner relevant to the identified caller party type.

In one embodiment of the invention, the process may be configured with call closure prompt 707 which may prompt the call handler user to end a call. For example, if a caller needs to attend to the situation at hand, call closure prompt 707 may prompt the call handler user to elicit final information from the caller and/or convey final instructions/information to the caller. Such information may also be a formatted in the data structure for use by a response unit.

These processes are representative of the features of the call handling system which may be relevant to a particular protocol in progress. It is not necessary, however, that each of these features be presented for a particular protocol. For example, the protocol is configured (i.e., programmed) with scripts designed to dynamically respond to a call. As each call may be unique, certain questions (i.e., 704, 705 and 706) may not be necessary for the particular protocol in progress. As such, unnecessary questions would not be presented to the user.

FIGS. 6 and 7 illustrate exemplary methodical embodiments of the invention. Those skilled in the art should readily recognize that the processes and steps shown and illustrated herein may be arranged and/or altered in other ways that fall within the scope in spirit of the invention. Those skilled in the art should also readily recognize that the embodiment may be implemented through software instructions. Such instructions may be stored on a storage media and retrieved and executed by a computer processor. Some examples of instructions are software, program code and firmware. Some examples of storage media are memory devices, tapes, disks, integrated circuits and servers. The instructions are operational when executed by the processor to direct the processor to operate in accordance with the invention. Those skilled in the art are familiar with storage media, instructions, processors and their various implementations.

Advantages of the preferred embodiments include a call handling system which may be used to handle call information of a plurality of situations that are either emergency or non emergency related. The call handling embodiments described and illustrated herein may also improve call information processing and reduce error rates because a singular protocol may be configured to dynamically respond to such varying call information through the dynamic selection of situation dependent protocol scripts. From these and other advantages, the embodiments described and illustrated herein may advantageously require use within or in conjunction with a CAD system.

While the invention has been illustrated and described in the drawings and foregoing description, such illustration and description is to be considered as exemplary and not restrictive in character. One embodiment of the invention and minor variants thereof have been shown and described. Those skilled in the art will appreciate variations of the above-described embodiments that fall within the scope of the invention. Protection is desired for all changes and modifications that come within the scope and spirit of the invention. Accordingly, the invention is not limited to the specific examples and illustrations discussed above, but only by the following claims and their equivalents.

What is claimed is:

1. A call handling system, comprising:
  a call interface configured for receiving call information, wherein the call information conveys substantially any of an emergency related matter or a non emergency related matter;
  a processor communicatively coupled to the call interface and configured for processing the call information to initiate a protocol; and
  a display unit configured for displaying keys, wherein selected said keys change a course of the protocol by providing at least one of instructions for the call handler to respond to a situation, recommendations of types of responders and recommendations of the priority of the responders.

2. The call handling system of claim 1, further comprising a computer aided dispatch interface configured for transferring data to one or more computer aided dispatch units.

3. The call handling system of claim 1, further comprising an application program interface configured for transferring ANI/ALI data from a telephony system.

4. The call handling system of claim 1, wherein the call handling system is configurable with one or more computer aided dispatch units and wherein the computer aided dispatch units are configured for dispatching responders based on one or more decisions of the protocol.

5. The call handling system of claim 1, wherein the processor is further configurable for processing data associated with the selected said keys to change the course of the protocol.

6. The call handling system of claim 1, further comprising a storage unit configured for storing a database of protocol terms, wherein the protocol terms are used to initiate the protocol.

7. The call handling system of claim 6, wherein the storage unit is further configured for storing a data structure and wherein the processor is further configured for transferring data to the data structure based on a course of the protocol.

8. The call handling system of claim 7, wherein the data structure is transferable to a computer aided dispatch for informing a dispatched responder.

9. A call handling network, comprising:
  a call interface configured for receiving call information, wherein the call information conveys substantially any of an emergency related matter or a non emergency related matter; and
  two or more call handling systems, wherein each call handling system is communicatively coupled to the call interface and comprises a processor configured for processing the call information to initiate a protocol, and wherein a first one of the two or more call handling systems is communicatively coupled to a second one of the two or more call handling systems for transferring the call information to the second one of the two or more call handling systems, each call handling system comprises a display unit configured for displaying keys, wherein selected said keys change a course of the protocol by providing at least one of instructions for the call handler to respond to a situation, recommendations of types of responders and recommendations of the priority of the responders.

10. The call handling network of claim 9, further comprising a computer aided dispatch interface configured for transferring data from at least one of the two or more call handling systems to a computer aided dispatch unit, wherein the computer aided dispatch unit is configured for dispatching responders based on one or more decisions of the protocol.

11. The call handling network of claim 9, wherein each processor is further configurable for processing data associated with the selected said keys to change the course of the protocol.

12. The call handling network of claim 9, wherein the call interface is a call handler server.

13. A call handling network, comprising:
  a call router; and
  a plurality of call handling subnetworks, wherein each call handling subnerwork is communicatively coupled to the call router and configured for receiving call information from the call router, wherein each subnetwork comprises a call interface configured for receiving the call information, wherein the call information conveys substantially any of an emergency related matter or a non emergency related matter; and
  at least one call handling system communicatively coupled to the call interface and comprising a processor configured for processing the call information to initiate a protocol, each call handling system comprises a display unit configured for displaying keys, wherein selected said keys change a course of the protocol by providing at least one of instructions for the call handler to respond to a situation, recommendations of types of responders and recommendations of the priority of the responders.

14. A call handling system, comprising:
  a call interface configured for receiving call information;
  a storage unit configured for storing protocol terms;
  a processor communicatively coupled between the call interface and the storage unit and configured for processing the call information, for populating a database with one or more cross-referenced said protocol terms based on processed said call information and for initiating a protocol based on a selection of the one or more crossreferenced said protocol terms; and a display unit configured for displaying keys, wherein selected said keys change a course of the protocol by providing at least one of instructions for the call handler to respond to a situation, recommendations of types of responders and recommendations of the priority of the responders.

15. The call handling system of claim 14, wherein the call handling system is configurable with a computer aided dispatch unit and wherein the computer aided dispatch unit is configured for dispatching responders based on one or more decisions of the protocol.

16. A method, comprising:

receiving call information conveying substantially any of an emergency related matter or a non emergency related matter;

processing the call information to initiate a protocol in response to receiving the call information;

transferring data to a data structure based on one or more decisions of the protocol; and displaying keys, wherein selected said keys change a course of the protocol by providing at least one of instructions for the call handler to respond to a situation, recommendations of types of responders and recommendations of the priority of the responders.

17. The method of claim 16, further comprising transferring at least a portion of the data structure to one or more computer aided dispatch units.

18. The method of claim 17 wherein transferring said at least a portion of the data structure comprises informing a dispatched responder about the call information.

19. The method of claim 16, further comprising updating one or more CAD systems via the data structure for dispatching responders based on the one or more decisions of the protocol.

20. The method of claim 16, further comprising processing data associated with the selected said keys to change the course of the protocol.

21. The method of claim 16, wherein processing comprises processing selected protocol terms to initiate the protocol.

* * * * *